United States Patent [19]

Coats

[11] Patent Number: 5,749,207
[45] Date of Patent: May 12, 1998

[54] LAWN MOWER PILOTING SYSTEM

[76] Inventor: Wayne E. Coats, 1635 N. Columbia Pl., Tulsa, Okla. 74110-2619

[21] Appl. No.: 623,252

[22] Filed: Mar. 28, 1996

[51] Int. Cl.$^6$ .......................... A01B 69/00; A01D 34/78
[52] U.S. Cl. ..................... 56/10.2 A; 56/10.2 R; 180/79
[58] Field of Search .............. 56/10.2 A, 10.2 R, 56/DIG. 15, 16.7; 180/79, 131; 242/85, 86.4, 86.5, 94

[56] References Cited

U.S. PATENT DOCUMENTS

| | | | |
|---|---|---|---|
| 2,259,193 | 10/1941 | Andrew | 180/79 |
| 2,796,944 | 6/1957 | Clement, Jr. | 180/79 |
| 3,650,097 | 3/1972 | Nokes | 56/10.2 |
| 3,744,223 | 7/1973 | Jensen | 56/10.2 R |
| 4,180,964 | 1/1980 | Pansire | 56/10.2 |
| 4,184,559 | 1/1980 | Rass | 180/131 |
| 4,347,908 | 9/1982 | Anderson | 56/10.2 R X |
| 4,440,091 | 4/1984 | Burgess | 56/10.2 R |
| 5,007,234 | 4/1991 | Shurman et al. | 56/10.2 |

OTHER PUBLICATIONS

Bud Fisher, Mutt :Jeff Cartoon, Washington Evening Star, Aug. 1952.

*Primary Examiner*—Terry Lee Melius
*Assistant Examiner*—Robert Pezzuto
*Attorney, Agent, or Firm*—Joseph N. Breaux

[57] ABSTRACT

A lawn mower piloting system that is detachably connectable to a self-propelled lawn mower which allows a user to steer the mower from a distance is provided. The lawn mower piloting system includes: a first rigid member detachably connectable to the mower; a second rigid member detachably connectable to the mower and connected to the first rigid member; a spring having a first spring end and a second spring end, the first spring end being connected to an end of the first rigid member; a flexible tension member having a first end and a second end, the first end being connected to a kill switch handle of the mower, the flexible tension member being threaded through the spring, and the flexible tension member being connected to the second spring end between the first end and the second end; and a hitch pin detachably securable about the kill switch handle and a mower handle for maintaining the kill switch handle in an operational position.

20 Claims, 1 Drawing Sheet

5,749,207

1

LAWN MOWER PILOTING SYSTEM

TECHNICAL FIELD

The present invention relates to devices for piloting a self-propelled lawn mower and more particularly to devices for piloting a self-propelled lawn mower that eliminate the need for the user to continuously follow behind the mower.

BACKGROUND ART

Landscaping is very important to the overall beauty and value of most homes. One of the most important components of the landscaping of many homes is a well-manicured lawn. In addition, having a well landscaped and manicured lawn is often the pride and joy of the owner of a home. Large amounts of time, effort and expense are involved in developing and maintaining a nice lawn, including such tasks as application of fertilizers and weed and insect killers at regular intervals, watering and mowing. Of these activities, mowing the lawn is often the most time and energy consuming.

Mowing the lawn is often a very enjoyable activity, giving an individual the chance to spend a little time outdoors with a visible confirmation of his efforts. However, in many parts of the United States, because of the high temperatures and/or high humidity, a potentially gratifying and necessary chore becomes a necessary chore that is miserable and dangerous. The chore becomes dangerous because the user often has to spend extensive time and/or do expensive walking under these hazardous weather conditions. In addition, trying to cut grass beneath low lying bushes and tree limbs can be annoying and frustrating under the best of weather conditions.

It would be a benefit, therefore, to have a piloting system that is readily and easily connected to a self-propelled lawn mower that allows the user to pilot the mower from a distance away from the mower handle. It would be a further benefit to have a piloting system that will guide the mower over a path without the aide of a user. It would be a still further benefit to have a piloting system which will shut down the mower when an object is struck. It would be an additional benefit, to have a self-propelled mower which may be shut down by firmly tugging on a flexible tension member.

GENERAL SUMMARY DISCUSSION OF INVENTION

It is thus an object of the invention to provide a lawn mower piloting system that is readily and easily connectable to a self-propelled lawn mower that enables the mower to be steered from a distance.

It is a further object of the invention to provide a lawn mower piloting system that allows a user to operate the mower either manually from a distance or automatically from a centralized location.

It is a still further object of the invention to provide a lawn mower piloting system that will stop the self-propelled mower when an object is struck.

It is a still further object of the invention to provide a lawn mower piloting system that is inexpensive, easy to install on conventional self-propelled lawn mowers and that is efficient.

Accordingly, a lawn mower piloting system that is detachably connectable to a self-propelled lawn mower which allows a user to steer the mower from a distance is provided. The lawn mower piloting system includes: a first rigid

2 member detachably connectable to the mower; a second rigid member detachably connectable to the mower and connected to the first rigid member; a spring having a first spring end and a second spring end, the first spring end being connected to an end of the first rigid member; a flexible tension member having a first end and a second end, the first end being connected to a kill switch handle of the mower, the flexible tension member being threaded through the spring, and the flexible tension member being connected to the second spring end between the first end and the second end; and a hitch pin detachably securable about the kill switch handle and a mower handle for maintaining the kill switch handle in an operational position.

In a preferred embodiment a grip is connected to the second end of the flexible tension member. With the grip which may be any type of handle, a user can easily hold the second end of the flexible tension member when manually guiding the mower.

In place of the grip or in addition thereto a spool that is connectable to the ground may be provided. The spool may have a swivel type stake to securely attach it to the ground so that it does not rotate as the mower revolves. More preferably, the spool has a pair of stakes extending from the bottom thereof to aide in attaching the flexible tension member thereon when a grip is attached and also preventing the spool from rotating. Preferably, the spool has a sufficient diameter so that as the mower revolves around the spool the mower makes a full cutting pass.

For optimum control of the mower using either the grip or the spool the first rigid member is connected adjacent the front of the mower and the second rigid member is connected adjacent a side facing the second end of the flexible tension member. The rigid members may also be pivotedly connected to one another so for additional control of the lawn mower.

The rigid members are detachably connectable to allow the assembly to be utilized with various lawn mowers. In addition the rigid members and the assembly may be detached for storing the mower.

It is critical that the spring have a spring constant sufficient to allow a change of direction of travel of the mower without causing the spring to significantly expand and exert a pulling force through the flexible tension member pulling the kill switch handle free from the hitch pin. The spring allows the mower to operate with the safety that if it hits an object the jolt will expand the spring freeing the kill switch handle from the hitch pin, thus, stopping the motor. In addition, the spring allows the user to pull on the flexible tension member to kill the mower.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
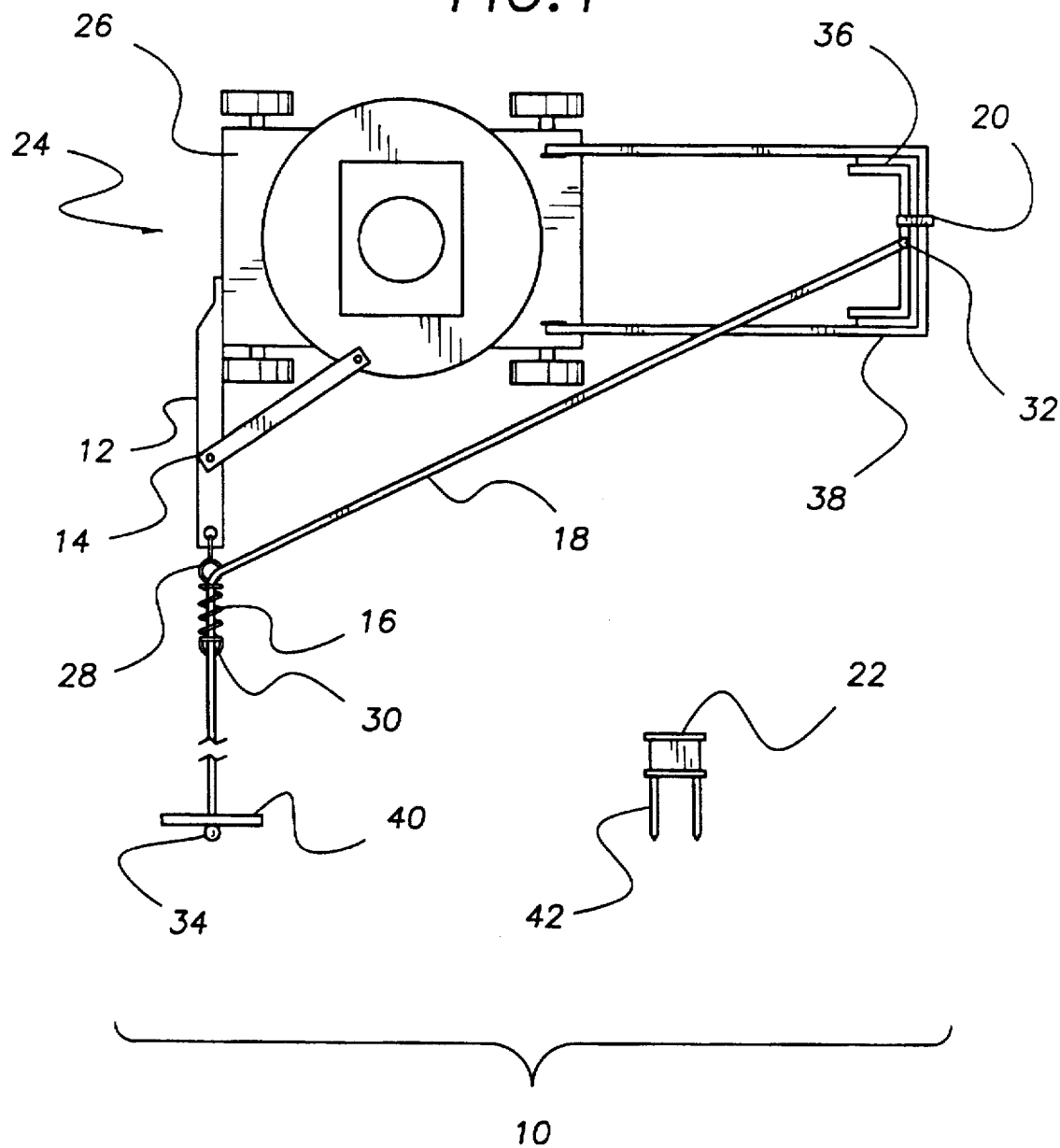
FIG. 1 is a top view of an exemplary embodiment of the lawn mower piloting system of the present invention.

FIG. 1 is a top view of an exemplary embodiment of the lawn mower piloting system of the present invention generally designated by the numeral 10. The piloting system includes a first rigid member 12, a second rigid member 14, a spring 16, a flexible flexible tension member 18, a hitch pin 20 and a spool 22.

Piloting system 10 is detachably connectable to a self-propelled lawn mower 24 for directing mower 24 about an area to be mowed. First and second rigid members 12,14 are constructed of metal. Rigid members 12,14 are pivotedly connected to each other and each is connectable to the frame 26 of mower 24 in different locations. First rigid member 12 is detachably connected adjacent the front of mower 24. Second rigid member 14 is detachably connected adjacent a side of mower 24.

Figure 1A:
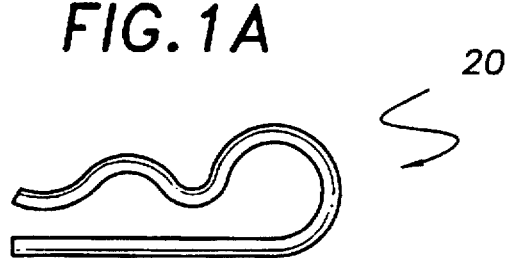
FIG. 1A is a side view of the hitch pin in isolation.

Spring 16 is a helical spring having a first spring end 28 and a second spring end 30. First spring end 28 is connected to an end of first rigid member 12. Flexible tension member 18 is a rope having a first end 32 and a second end 34. First end 32 of flexible tension member 18 is connected to the kill switch handle 36 and the second end 34 of flexible tension member 18 is threaded through the interior of spring 16. Flexible tension member 18 is connected to second spring end 30 between first and second ends 32,34 thereof. Flexible tension member 18 is connected to second spring end 30 so that when kill switch handle 36 is in the operational position flexible tension member 18 between first end 32 and second spring end 30 is substantially in tension. Kill switch handle 36 is maintained in an operational position by hitch pin 20 which is detachably securable about the mower handle 38 and kill switch handle 36. FIG. 1A shows a side view of hitch pin 20.

It is critical that spring 16 have a spring constant sufficient to allow a change of direction of travel of mower 24 without causing spring 16 to significantly expand and exert a pulling force through flexible tension member 18 pulling kill switch handle 36 free from hitch pin 20. However, the spring constant needs to be one at which when the user yanks on flexible tension member 18, or when mower 24 strikes an object, that spring 16 is expanded a sufficient distance to free kill switch handle from hitch pin 20.

Connected to the second end 34 of flexible tension member 18 is a grip 40, so that a user may hold flexible tension member 18 to manually direct mower 24 as it cuts the grass. Spool 22 is provided for automatic piloting of mower 24. Spool 22 is connectable with second end 34 of flexible tension member 18 and is ridgedly securable to the ground by a pair of stakes 42 extending from the bottom thereof.

Use of lawn mower piloting system 10 is now described with reference to FIGS. 1 and 1A. In a manual piloting application the user orients mower 24 in the direction the user desires to mow (not shown). For example, mower 24 may be oriented to pass under low brush or in a circular path allowing the to stand in the shade. The user then starts mower 24 and secures kill switch handle 36 in the operational position with hitch pin 20. The user then steers the mower in the chosen path. If mower 24 strikes an object and is directed away from the user, a force will be exerted on flexible tension member 18 causing spring 16 to significantly expand and exert a pulling force through flexible tension member 18 pulling kill switch handle 36 free from hitch pin 20. When the user desires to stop the mower he may pull on flexible tension member 18, expanding spring 16, freeing kill switch handle 36 from hitch pin 20.

To use piloting system 10 in the automatic mode, the user secures spool 22 to the ground or in a tree stump (not shown), second end 34 of flexible tension member 18 is connected to spool 22, mower 24 is oriented in the desired path to be mowed, mower 24 is started and kill switch handle 36 is secured in the operational position with hitch pin 20. As mower 24 is propelled, flexible tension member 18 wraps around spool 22 so that the diameter of the path of mower 24 is decreased with each revolution about spool 22. Stakes 42, in addition to securing spool 22 to the ground prevent spool 22 from rotating.

It can be seen from the preceding description that a device for piloting a self-propelled lawn mower which is readily and easily connectable to a self-propelled lawn mower that enables the mower to be steered from a distance, allows a user to operate the mower either manually from a distance or automatically from a centralized location, will stop the self-propelled mower when an object is struck, and that is inexpensive, easy to install on conventional self-propelled lawn mowers and that is efficient has been provided.

It is noted that the embodiment of the lawn mower piloting system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A lawn mower piloting system connectable to a self-propelled lawn mower having a mower handle and a kill switch including a kill switch handle, said lawn mower piloting system comprising:

a first rigid member detachably connectable to the mower;

a second rigid member detachably connectable to the mower and connected to said first rigid member;

a spring having a first spring end and a second spring end, said first spring end being connected to an end of said first rigid member;

a flexible tension member having a first end and a second end, said first end being connectable to the kill switch handle of the mower, said flexible tension member being threaded through said spring, said flexible tension member being connected to said second spring end between said first end and said second end; and a hitch pin detachably securable about the kill switch handle and the mower handle for maintaining the kill switch handle in an operational position.

2. The lawn mower piloting system of claim 1, further including:

a grip connected to said second end of said flexible tension member.

3. The lawn mower piloting system of claim 1, further including:

a spool connectable to said second end of said flexible tension member, said spool adapted for securing to the ground.

4. The lawn mower piloting system of claim 2, further including:

a spool connectable to said second end of said flexible tension member, said spool adapted for securing to the ground in a manner such that said spool does not rotate.

5. The lawn mower piloting system of claim 1, wherein:

said spring has a spring constant sufficient to allow a change of direction of travel of the mower without causing said spring to significantly expand and exert a pulling force through said flexible tension member pulling the kill switch handle free from said hitch pin.

6. The lawn mower piloting system of claim 1, wherein:
said first rigid member is detachably connectable adjacent a front of the mower.

7. The lawn mower piloting system of claim 6, wherein:
said second rigid member is detachably connectable adjacent a side of the mower.

8. The lawn mower piloting system of claim 1, wherein:
said first and said second rigid members are pivotedly connected.

9. The lawn mower piloting system of claim 2, wherein:
said spring has a spring constant sufficient to allow a change of direction of travel of the mower without causing said spring to significantly expand and exert a pulling force through said flexible tension member pulling the kill switch handle free from said hitch pin.

10. The lawn mower piloting system of claim 2, wherein:
said first rigid member is detachably connectable adjacent a front of the mower; and
said second rigid member is detachably connectable adjacent a side of the mower.

11. The lawn mower piloting system of claim 3, wherein:
said spring has a spring constant sufficient to allow a change of direction of travel of the mower without causing said spring to significantly expand and exert a pulling force through said flexible tension member pulling the kill switch handle free from said hitch pin.

12. The lawn mower piloting system of claim 3, wherein:
said first rigid member is detachably connectable adjacent a front of the mower; and
said second rigid member is detachably connectable adjacent a side of the mower.

13. A lawn mower piloting system connectable to a self-propelled lawn mower having a mower handle and a kill switch including a kill switch handle, said lawn mower piloting system comprising:
a first rigid member detachably connectable to the mower;
a second rigid member detachably connectable to the mower and connected to said first rigid member;
a flexible tension member having a first end and a second end, said first end being connectable to the kill switch handle of the mower;
a spring having a first spring end and a second spring end, said first spring end being connected to an end of said first rigid member, said flexible tension member being threaded through an interior of said spring and said flexible tension member being connected to said second spring end between said first and second end thereof;
a grip connected to said second end of said flexible tension member; and a hitch pin detachably securable about the kill switch handle and the mower handle for maintaining the kill switch handle in an operational position.

14. The lawn mower piloting system of claim 13, further including:
a spool connectable to said second end of said flexible tension member, said spool adapted for securing to the ground.

15. The lawn mower piloting system of claim 13, wherein:
said first and said second rigid members are pivotedly connected.

16. The lawn mower piloting system of claim 14, wherein:
said spool includes:
a pair of stakes extending from a bottom thereof.

17. A lawn mower piloting system connectable to a self-propelled lawn mower having a mower handle and a kill switch including a kill switch handle, said lawn mower piloting system comprising:
a self-propelled lawn mower;
a first rigid member detachably connectable to the mower;
a second rigid member detachably connectable to the mower and connected to said first rigid member;
a flexible tension member having a first end and a second end, said first end being connectable to the kill switch handle of the mower;
a spring having a first spring end and a second spring end, said first spring end being connected to an end of said first rigid member, said flexible tension member being threaded through an interior of said spring and said flexible tension member being connected to said second spring end between said first and second end thereof;
a hitch pin detachably securable about the kill switch handle and the mower handle for maintaining the kill switch handle in an operational position;
a grip connected to said second end of said flexible tension member; and
a spool connectable to said second end of said flexible tension member, said spool adapted for securing to the ground.

18. The lawn mower piloting system of claim 17, wherein:
said first rigid member is detachably connectable adjacent a front of the mower; and
said second rigid member is detachably connectable adjacent a side of the mower.

19. The lawn mower piloting system of claim 18, wherein:
said first and said second rigid members are pivotedly connected.

20. The lawn mower piloting system of claim 19, wherein:
said spool includes:
a pair of stakes extending from a bottom thereof.

* * * * *